3,677,899
PROCESS FOR PRODUCING CELLULASE

Masanobu Kawai, Tokyo-to, Japan, assignor to Kyowa Hakko Kogyo Kabushiki Kaisha, Tokyo-to, Japan
No Drawing. Filed Jan. 21, 1970, Ser. No. 4,733
Claims priority, application Japan, Feb. 3, 1969, 44/7,275
Int. Cl. C12d 13/10
U.S. Cl. 195—66 R    4 Claims

ABSTRACT OF THE DISCLOSURE

A novel cellulase is prepared by cultivating a wood decaying microorganism of the genera Lampteromyces or Formitopsis in a nutrient medium and recovering the cellulase from the medium. The cellulase so produced has high $C_1$ and CMC-ase activity at a low optimum pH.

---

The present invention relates to a process for producing cellulase by culturing Basidiomycetes in a culture medium containing suitable amounts of carbohydrate material, nitrogen source, inorganic salt, fermentation-promoter, etc.

Cellulase is a well known substance which can be obtained from animals such as snails, clams, etc., and from some microorganisms. The cellulase obtained from these sources, however, has not, in spite of extensive efforts, found wide practical application.

The reasons for the above include, for example, the facts that microorganisms belonging to genera Chaetomium and Myrothecium do not secrete cellulase from the microbial bodies, that wood decaying microorganisms belonging to the genus Trametes and others are rarely cultivated owing to their slow growth, and that, in the case of bacteria, it is difficult to separate microbial bodies from culture broth on an industrial scale.

Moreover, the amount of cellulase produced by the microorganisms is generally so small that it is impractical to use them for commercial purposes. The microorganisms which may at present be used for industrial production are only those belonging to the genera Aspergillus, Trichoderma, Trametes, etc. It is said that cellulase does not consist of a single enzyme but is a complex of various enzymes. According to Reeds (E. T. Reeds: Applied Microbiology, vol. 4, page 39, 1956), this can be shown by the following formula:

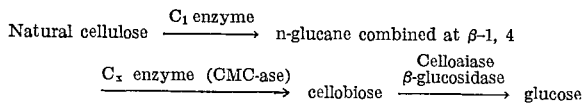

The $C_1$ enzyme is, however, the practically useful one.

On the other hand, the cellulase of genus Aspergillus is of little use because it has weak $C_1$-activity, although it does have a strong CMC-ase activity. The cellulase of genera Trichoderma and Trametes has a strong $C_1$-activity and has been extensively studied as a promising strain, although it is weaker than the cellulase of genus Aspergillus in CMC-ase activity. Moreover, Trichoderma can not be cultivated by the industrially practical submerged procedure.

The applicant has previously discovered a novel method for preparing the protease of Basidiomycetes (Japanese patent application No. 45,596/1968), and through this method has tested the cellulase productivities of various wood-decaying microorganisms. As a result, it was discovered that among strains which have previously been considered of no practical use, some strains are strong in both $C_1$ and CMC-ase activities and furthermore are capable of producing novel cellulase having low optimum pH. The present invention is based upon this discovery.

It has been found that any strain belonging to the genera Lampteromyces and Fomitopsis may be used for the purpose of the present invention. They can be exemplified by *Lampteromyces japonicus* (ATCC 20195), *Fomitopsis cytisina* (ATCC 20196), *Fomitopsis pinicola* (ATCC 20036), and *Fomitopsis annosa* (ATCC 20194), etc., these microorganisms being freely available to the public on an unrestricted basis.

These strains are illustrated by Rokuya Imazeki and Tsuguo Hongo: Genshoku Nippon Kinrui Zukan (Coloured Illustrations of Fungi of Japan), Hoiku-sha, Tokyo (1957). Although Basidiomycetes are sometimes named differently, depending upon classification and descriptive methods, any strain classified in the said genera by Imazeki et al. may be used in the present invention.

According to the present invention, the Basidiomycetes is cultivated in a medium, which may be liquid or solid. A liquid medium is preferable, and either surface or submerged cultivation can be used.

The medium should contain assimilable nutrients which are suitable for the strain used. As the carbon source, sucrose, glucose, maltose, lactose, starch, dextrin, molasses, cellulose powder, absorbent cotton, etc. can generally be used, and as the nitrogen source, inorganic and organic nitrogen-containing materials such as ammonium salts, nitrates, peptone, meat extract, corn steep liquor, soybean protein, wheat flour, yeast cell, distillers solubles, urea, etc. can be used. It is also possible to use inorganic substances and metallic salts, such as phosphates, potassium salts, magnesium salts, iron salts, zinc salts, etc., if desired. Furthermore, vitamins, growth-promoting factors, etc. can be added.

For cultivating Basidiomycetes, the cultivating conditions vary, depending upon the strain used, medium composition, etc. Preferably, the cultivating temperature is 20–35° C., and the pH of the medium is from 4 to 7. The accumulation of cellulase reaches its maximum after culturing for 5–10 days. The conditions should, of course, be those resulting in a maximum yield of cellulase.

The cellulase obtained on culturing can be precipitated or concentrated by adding 50–65 (v./v.)% of an organic solvent such as acetone, alcohol, etc., or 40–70 (w./v.)% of a precipitating agent such as ammonium sulfate, calcium chloride, etc. to an aqueous extract of the culture in the case of solid cultivation, and to a filtered culture broth in the case of liquid cultivation. The concentrate can easily be purified by conventional methods, such as, for example, Sephadex treatment, adsorption on and elution from an ion exchange material, such as an ion exchange resin, etc. The thus obtained cellulase is soluble in water and not only has a strong $C_1$ activity but also a strong CMC-ase activity as shown in Tables 1 and 2 to be set forth hereinafter. Moreover, the optimum pH is lower than that of any of the known cellulases, as shown in Table 3, also to be set forth hereinafter. These characteristics have not been found in any of the known types of cellulases. The present cellulase can thus be considered a novel type of enzyme. The optimum temperature for cellulase activity is 40–50° C.

TABLE 1.—FILTER PAPER DECOMPOSING ACTIVITY OF VARIOUS CELLULASES

|  | Filter paper decomposing time (minutes) | | | | | |
|---|---|---|---|---|---|---|
|  | 30 | 60 | 90 | 120 | 150 | 180 |
| Enzyme of the present invention. | ± | + | ++ | ++++ | | |
| Enzyme produced by Trichoderma sp. | + | +++ | ++++ | | | |
| Enzyme produced by Trametes (sanguinae). | ± | ++++ | | | | |
| Enzyme produced by Aspergillus sp. | − | ± | + | + | ++++ | |

The preceding table reports the results of tests carried out in accordance with the method described by Kitamikado and Toyama: Journal of Fermentation Technology, vol. 40, page 85 (1962) and the respective activities are expressed in the manner defined by the authors. Each test was carried out at a temperature of 40° C. using a 1% solution of the enzyme in a citric acid buffer solution. The solution was buffered at a pH of 3.0 in the case of the enzyme of the invention and at a pH of 4.5 in the cases of the others.

TABLE 2

CMC-decomposing activity of various cellulases

| | CMC-decomposing activity |
|---|---|
| Enzyme produced by the present invention | 2,800 |
| Enzyme produced by Trichoderma sp. | 4,600 |
| Enzyme produced by Trametes (sanguinae) | 2,500 |
| Enzyme produced by Aspergillus sp. | 6,200 |

The preceding table reports the results of tests carried out in accordance with the method described by Matsuba et al.: Journal of Fermentation Technology, vol. 41, page 47 (1963). A substrate having a concentration of 0.625% was reacted at a temperature of 40° C. for 1 hour. The amount of enzyme which produced 10.8 mg. of reducing sugar was defined as one (1) unit. The determination of sugar was conducted by the Nelson-Somogi method. Each test was carried out at a temperature of 40° C. using a 0.5% solution of the enzyme in a citric acid buffer solution. The solution was buffered at a pH of 3.0 in the case of the enzyme of the invention and at a pH of 4.5 in the cases of the others.

TABLE 3

Optimum pH of various cellulases for CMC-decomposing

| | Optimum pH |
|---|---|
| Enzyme produced by the present invention | 3.0 |
| Enzyme produced by Trichoderma sp. | 4.5 |
| Enzyme produced by Trametes (sanguinae) | 4.5 |
| Enzyme produced by Aspergillus sp. | 5.0–7.0 |

The preceding table reports the results of tests carried out in accordance with the method described by Matsumura et al.: Journal of Fermentation Technology, vol. 41, page 154 (1963); Nara et al.: Journal of Fermentation Technology, vol. 42, page 405 (1964) and Matsuba et al.: Record of the 2nd and 3rd Cellulase Research Meeting (1963).

The present invention is illustrated by the following examples, which are not, however, to be construed as limiting the invention.

EXAMPLE 1

30 ml. of a medium having a composition of 2% of sucrose, 1% of cellulose powder, 3% of distillers solubles, 0.3% of yeast extract, 0.5% of $KH_2PO_4$ and 0.05% of $MgSO_4 \cdot 7H_2O$ was adjusted to a pH of 5.5, placed in a 250 ml. flask and sterilized. Portions of this medium were inoculated separately with *Lampteromyces japonicus*, *Fomitopsis cytisina*, *Fomitopsis annosa* and *Fomitopsis pinicola* and cultivated at a temperature of 30° C. for 7 days with shaking. The activities (per ml.) of the filtered culture broths were as follows:

| | A, min. | B, mm. |
|---|---|---|
| *Lampteromyces japonicus* ATCC 20195 | 105 | 50 |
| *Fomitopsis cytisina* ATCC 20196 | 120 | 55 |
| *Fomitopsis pinicola* ATCC 20036 | 180 | 50 |
| *Fomitopsis annosa* ATCC 20194 | 180 | 30 |

NOTE.—A=Activity in decomposing filter paper (time until complete decomposition—minutes); B=Activity in liquefying CMC (length of liquefied layer of 4% CMC gel after 24 hours).

EXAMPLE 2

Wheat bran, rice bran, soybean meal and distillers solubles were mixed in a ratio of 10:1:1:1 respectively, moistened well with water and sterilized to obtain a solid medium which was inoculated with mycelia of *Lampteromyces japonicus* and *Fomitopsis cytisina*, previously cultivated in liquid media and then cultivated at a temperature of 25° C. for 10 days. After cultivation, each of the culture media was finely subdivided and extracted with 5 times its volume of water at room temperature for 2 hours. The activities (per ml.) of the extracts were as follows:

| | A, min. | B, mm. |
|---|---|---|
| *Lampteromyces japonicus* ATCC 20195 | 150 | 2,600 |
| *Fomitopsis cytisina* ATCC 20196 | 160 | 2,100 |

NOTE.—A=Activity in decomposing filter paper (minutes); B=Activity in decomposing CMC.

EXAMPLE 3

3,000 ml. of a medium having a composition of 2% sucrose, 1% soybean meal, 3% distillers solubles, 0.3% yeast extract, 0.5% $KH_2PO_4$ and 0.05% $MgSO_4 \cdot 7H_2O$ was adjusted to a pH of 5.5. The medium was inoculated with *Lampteromyces japonicus* (ATCC 20195) and cultivated aerobically at a temperature of 30° C. for 5 days with stirring. After completion of the cultivation, the microbial body was separated by filtration. The filtrate was cooled to 0° C. and there was added 65 (v./v.)% of acetone which had previously been cooled to −20° C. The resulting precipitate was washed with ether and dried in vacuo to obtain 27 g. of a dark brown powder. The filter paper-decomposing activity per gram of powder was 95 minutes. The CMC-decomposing activity was 5,000 CUN/g.

I claim:
1. A process of preparing a cellulase comprising cultivating a wood decaying microorganism of the genus Lampteromyces on a nutrient medium therefor and recovering said cellulase from said medium.

2. A process as claimed in claim 1 in which said microorganism is *Lampteromyces japonicus* ATCC 20195.

3. A process as claimed in claim 1 in which the temperature of said culture medium is maintained within the range of about 20 to 35° C. and the pH within the range of 4 to 7.

4. A process as claimed in claim 3 in which cultivation is carried out for from 5 to 10 days.

References Cited

Mattison et al.: Chemical Abstracts, vol. 66 (1967), 9937v and 9938c.

Ahlgren et al.: Acta Chemica Scandinavica, vol. 21 (1967), 1193–1200.

LIONEL M. SHAPIRO, Primary Examiner

U.S. Cl. X.R.

195—62